United States Patent
Yoshimura et al.

(10) Patent No.: US 8,442,222 B2
(45) Date of Patent: May 14, 2013

(54) JOB TICKET ISSUING DEVICE AND JOB EXECUTION DEVICE

(75) Inventors: Tomonari Yoshimura, Kyoto (JP);
Daisuke Sakiyama, Kawanishi (JP);
Okihisa Yoshida, Amagasaki (JP);
Yoichi Kawabuchi, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1547 days.

(21) Appl. No.: 11/260,394

(22) Filed: Oct. 28, 2005

(65) Prior Publication Data

US 2007/0002351 A1   Jan. 4, 2007

(30) Foreign Application Priority Data

Jun. 30, 2005   (JP) ................... 2005-191505

(51) Int. Cl.
*G09C 5/00* (2006.01)

(52) U.S. Cl.
USPC ................ 380/55; 380/243; 726/26

(58) Field of Classification Search ........... 713/171, 713/165, 150; 726/26, 2, 29; 380/243, 55; 358/1.13, 1.15
See application file for complete search history.

(56) References Cited

U.S. PATENT DOCUMENTS

| 6,181,436 | B1 * | 1/2001 | Kurachi ............... 358/1.15 |
| 6,950,205 | B2 | 9/2005 | Takeo |
| 7,523,313 | B2 * | 4/2009 | Noguchi ............... 713/176 |
| 2004/0080772 | A1 * | 4/2004 | Snyders ............... 358/1.14 |
| 2004/0184064 | A1 | 9/2004 | TaKeda et al. |
| 2005/0275868 | A1 * | 12/2005 | Higashiura et al. .......... 358/1.14 |
| 2009/0244620 | A1 * | 10/2009 | Takahashi et al. .......... 358/1.15 |

FOREIGN PATENT DOCUMENTS

| EP | 1 091 285 A2 | 4/2001 |
| JP | 2000-172566 | 6/2000 |
| JP | 2001-186358 | 7/2001 |
| JP | 2003-084946 | 3/2003 |
| JP | 2003-91386 | 3/2003 |
| JP | 2003-308196 | 10/2003 |
| JP | 2003-316458 | 11/2003 |
| JP | 2004-287824 | 10/2004 |

OTHER PUBLICATIONS

Notification of Reasons for Refusal in JP 2005-191505 dated Feb. 19, 2008, and Translation thereof.

* cited by examiner

*Primary Examiner* — Samson Lemma

(74) *Attorney, Agent, or Firm* — Buchanan Ingersoll & Rooney PC

(57) ABSTRACT

A job ticket issuing device includes: a document encryption processing unit for encrypting document data with a document data encryption key; and a job ticket encryption processing unit for encrypting a job ticket, including information about a content of job processing with respect to the document data, with a job ticket encryption key which is different from the document data encryption key.

33 Claims, 12 Drawing Sheets

JOB TICKET ISSUING DEVICE AND JOB EXECUTION DEVICE

This application is based on Japanese Patent Application No. 2005-191505 filed in Japan on Jun. 30, 2005, the contents of which are hereby incorporated by reference.

BACKGROUND OF THE INVENTION

1. Field of the Invention

The present invention relates to a job ticket issuing device for issuing job tickets including information relating to the content of job processing of document data, and a job execution device for executing jobs.

2. Description of the Related Art

Conventionally, in executing a print job of a document, there is proposed art to encrypt the document and the print job by using a plurality of encryption keys belonging to different people, for security reason as shown in Japanese Patent Laid-open Publication No. 2001-186358. There is also proposed art to encrypt print data including information for decrypting an encrypted document as shown in Japanese Patent Laid-open Publication No. 2004-287824. Further, there is proposed art that in an environment where a plurality of print jobs are executed to one document, a plurality of jobs having different printing conditions are generated with respect to one document, and they are correlated with the original document as shown in Japanese Patent Laid-open Publication No. 2003-91386.

In the above-mentioned methods for encrypting documents and print jobs, the documents and the jobs including the print information are encrypted collectively and transmitted to a printer. Therefore, in order to execute jobs of different printing conditions, there is a need to additionally encrypt the document and the printing conditions collectively. There is also a problem that the load on communication increases due to an increase in the amount of data to be transmitted. Moreover, even in a case of generating a plurality of print jobs to one document as described above, the security level is low since they are not encrypted.

SUMMARY OF THE INVENTION

An object of the present invention is to provide a job ticket issuing device capable of improving the security level and reducing the load on encryption processing of documents and print jobs, in executing job processing such as printing of documents.

A job ticket issuing device according to the present invention comprises: a document encryption processing unit for encrypting document data with a document data encryption key; and a job ticket encryption processing unit for encrypting a job ticket, including information about the content of job processing with respect to the document data, with a job ticket encryption key which is different from the document data encryption key.

The job ticket may include a restriction information which is at least one of a changeable content of job processing, a unchangeable content of job processing.

The job ticket issuing device may further comprise an encrypted job ticket transmission unit for transmitting the encrypted job ticket, and an encrypted document data transmission unit for transmitting the encrypted document data.

The job ticket generation unit may generate a job ticket further including a document data decryption key used for decrypting the encrypted document data in addition to the information about the content of the job processing. Further, the job ticket generation unit may generate a job ticket further including identification information of the job ticket and identification information of the document data in addition to the information about the content of the job processing. Moreover, the job ticket generation unit is capable of generating a plurality of job tickets with respect to a piece of document data.

Further, the job ticket encryption processing unit may encrypt the plurality of job tickets with different job ticket encryption keys, respectively.

Further, the job ticket issuing device may further comprise a job ticket decryption key transmission unit for transmitting a job ticket decryption key used for decrypting the encrypted job ticket.

Further, the job ticket issuing device may further comprise a job ticket verification information management unit for managing job ticket verification information for correlating the job ticket and the document data.

A job ticket issuing method according to the present invention comprises the steps of: transmitting encrypted document data in which document data is encrypted with a document data encryption key; encrypting a job ticket, including information about the content of job processing with respect to the document data, with a job ticket encryption key which is different from the document data encryption key; and transmitting the encrypted job ticket.

The job ticket issuing method may further comprise the step of encrypting the document data with the document data encryption key.

A job ticket issuing method according to the present invention comprises the steps of: encrypting document data with a document data encryption key; and encrypting a job ticket, including information about the content of job processing with respect to the document data, with a job ticket encryption key which is different from the document data encryption key.

The job ticket may include a restriction information which is at least one of a changeable content of job processing, a unchangeable content of job processing.

The job ticket issuing may further comprise the step of transmitting the encrypted job ticket, and the step of transmitting the encrypted document data.

Further, the job ticket issuing method may further comprise the step of generating the job ticket including information about the content of the job processing with respect to the document data.

In the step of generating the job ticket, a job ticket further including a document data decryption key used for decrypting the encrypted document data, in addition to the information about the content of the job processing, may be generated. Further, in the step of generating the job ticket, a job ticket further including identification information of the job ticket and identification information of the document data, in addition to the information about the content of the job processing, may be generated. Moreover, in the step of generating the job ticket, a plurality of job tickets can be generated with respect to a piece of document data.

Further, in the step of encrypting the job ticket, the plurality of job tickets may be encrypted with different job ticket encryption keys, respectively.

Further, the job ticket issuing method may further comprise the step of transmitting a job ticket decryption key used for decrypting the encrypted job ticket, and the step of generating job ticket verification information for correlating the job ticket with the document data.

The present invention may be configured with a job ticket issuance program for prompting a computer to execute the job ticket issuing method. Further, the job ticket issuance program may be stored on a computer-readable recording medium.

A job execution device according to the present invention comprises: a memory for storing encrypted document data; a job ticket receiving unit for receiving an encrypted job ticket which includes information about the content of job processing with respect to the document data; a job ticket decryption processing unit for decrypting the encrypted job ticket by using a job ticket decryption key; a job processing information extraction unit for extracting the information about the content of the job processing from the decrypted job ticket; a document data decryption processing unit for decrypting the encrypted document data by using a document data decryption key which is different from the job ticket decryption key; and a document data job processing unit for executing a job, based on the content of the job processing extracted, with respect to the decrypted document data.

The job ticket may include a restriction information which is at least one of a changeable content of job processing, a unchangeable content of job processing. The job execution device further includes a job processing content change prohibiting unit for prohibiting a part of the processing content based on the restriction information.

The job execution device may further include a display unit for displaying the changeable content based on the restriction information.

The job execution device may further comprise an encrypted document data receiving unit for receiving the encrypted document data.

The job ticket may further include the document data decryption key, and the job execution device may further comprise a document data decryption key extraction unit for extracting the document data decryption key from the decrypted job ticket.

Further, the job ticket may further include identification information of the job ticket and identification information of the document data; and the job execution device may further comprise a job ticket verification information management unit for extracting the identification information of the job ticket and the identification information of the document data from the decrypted job ticket, and verifying it with job ticket verification information for correlating the job ticket with the document data.

A job executing method according to the present invention comprises the steps of: storing encrypted document data; receiving an encrypted job ticket, including information about the content of job processing with respect to the document data, independently of the document data; decrypting the encrypted job ticket by using a job ticket decryption key; extracting the information about the content of the job processing from a decrypted job ticket; decrypting the encrypted document data by using a document data decryption key which is different from the job ticket decryption key; and executing a job based on the content of the job processing extracted, with respect to decrypted document data.

The job ticket may include a restriction information which is at least one of a changeable content of job processing, a unchangeable content of job processing. The job execution method may further include prohibiting a part of the processing content based on the restriction information.

The job execution method may further include displaying the changeable content based on the restriction information.

The job executing method may further comprise the step of receiving the encrypted document data.

The job ticket may further include the document data decryption key, and the job executing method may further comprise the step of extracting the document data decryption key from the decrypted job ticket.

Further, the job ticket may further include identification information of the job ticket and identification information of the document data, and the job executing method may further comprise the step of extracting the identification information of the job ticket and the identification information of the document data from the decrypted job ticket, and verifying it with job ticket verification information for correlating the job ticket with the document data.

Further, the present invention may be configured with a job execution program for prompting a computer to execute the job executing method. Further, the job execution program may be stored on a computer-readable recording medium.

According to the job ticket issuing device of the present invention, document data and a job ticket are encrypted separately with a document data encryption key and a job ticket encryption key which are different to each other, respectively. Therefore, the security level can be improved. Further, even in a case where a plurality of job tickets are generated for a piece of document data, encryption processing can be performed only for the job tickets independently from the document data, Therefore, the load on the encryption processing can be reduced.

BRIEF DESCRIPTION OF THE DRAWINGS

The present invention will become readily understood from the following description of preferred embodiments thereof made with reference to the accompanying drawings, in which like parts are designated by like reference numeral and in which.

DESCRIPTION OF THE PREFERRED EMBODIMENT

Figure 1:
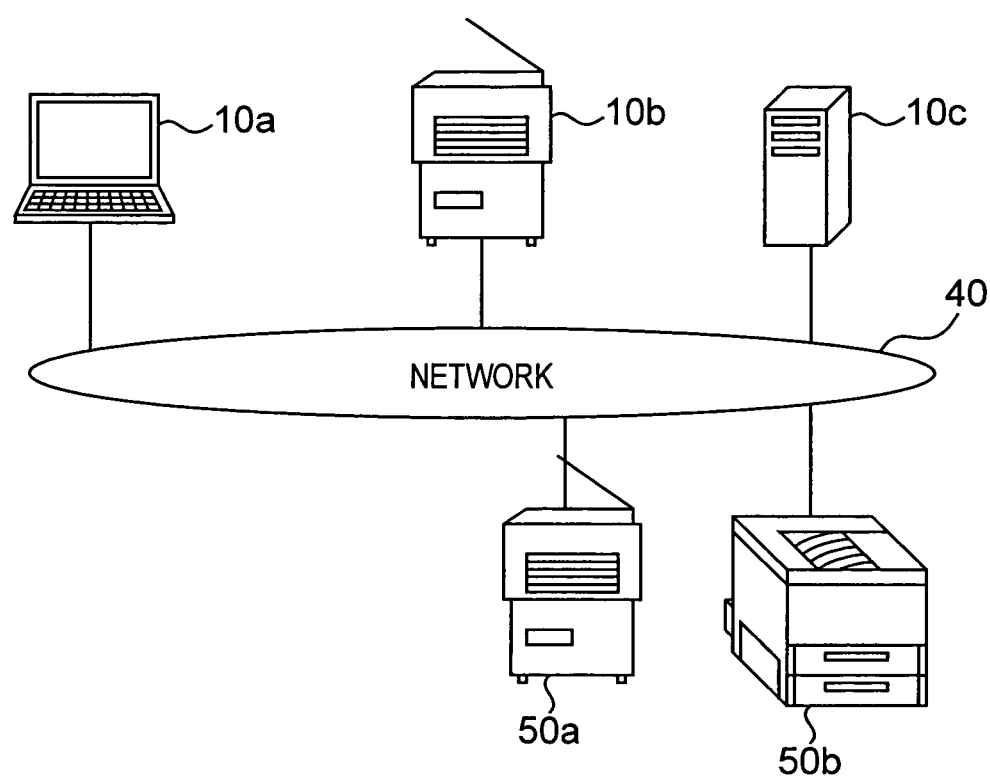
FIG. 1 is a schematic diagram showing the configuration of a network including job ticket issuing devices and job execution devices according to an embodiment 1 of the present invention.

A job ticket issuing device and a job ticket issuing method, and a job execution device and a job executing method according to an embodiment of the present invention will be explained below by using accompanying drawings. In the drawings, substantially same members are denoted by same reference numerals.

Embodiment 1

FIG. 1 is a schematic diagram showing the configuration of a job ticket issuing device 10 and a job execution device 50 according to an embodiment 1 of the present invention. The job ticket issuing device 10 may be a terminal 10a such as a PC, a multi function peripheral (MFP1) 10b capable of storing and delivering document data (including image data), or a server 10c for storing and delivering document data. The job execution devices 50 may be, for example, a multi function peripheral (MFP2) 50a capable of executing jobs such as storing and printing of document data, or a printer 50b. The job ticket issuing device 10 and the job execution device 50 are connected over a network 40. Note that the multiple function peripherals (MFP1, MFP2) are not limited to one side of the job ticket issuing device 10 and the job execution device 50, but are capable of realizing either function of the job ticket issuing device 10 and the job execution device 50.

Figure 2:
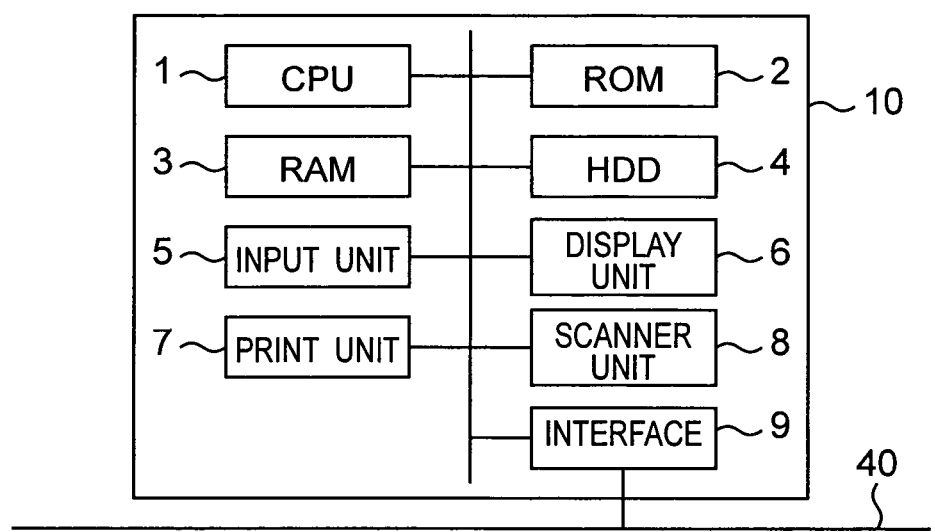
FIG. 2 is a block diagram showing the physical configuration of the job ticket issuing device according to the embodiment 1 of the present invention.

FIG. 2 is a block diagram showing the physical configuration of the multiple function peripheral (MFP1) 10b as a typical example of the job ticket issuing devices 10. This job ticket issuing device 10, which is a document management device, includes a CPU 1, a ROM 2, a RAM 3, an HDD 4, an input unit 5, a display unit 6, a printing unit 7, a scanner unit 8, and an interface 9 capable of connecting with the network 40. For the terminal 10a and the server 10c, the physical configuration of the job ticket issuing device 10 is one excluding the printing unit 7 and the scanner unit 8. The job execution device 50 may have a physical configuration similar to that of the job ticket issuing device 10.

Figure 3:
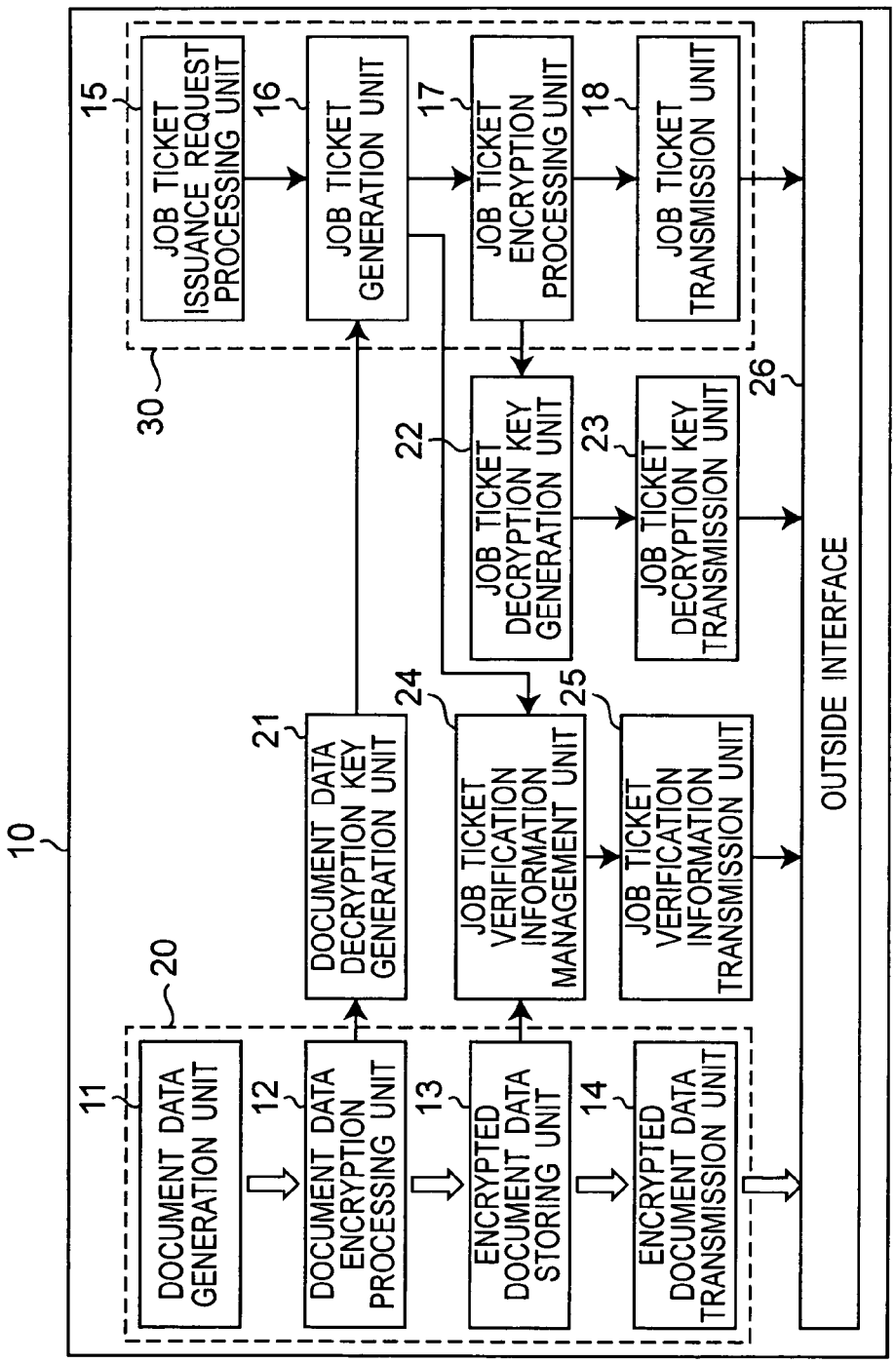
FIG. 3 is a block diagram showing the functional configuration of the job ticket issuing device according to the embodiment 1 of the present invention.

FIG. 3 is a block diagram showing the functional configuration of the job ticket issuing device 10. This job ticket issuing device 10 includes a document data unit 20 and a job ticket unit 30. Further, the job ticket issuing device 10 also includes a document data decryption key generation unit 21, a job ticket decryption key generation unit 22, a job ticket decryption key transmission unit 23, a job ticket verification information management unit 24, and a job ticket verification information transmission unit 25.

Each component thereof will be explained below.

The document data unit 20 includes a document data generation unit 11, a document data encryption processing unit 12, an encrypted document data storing unit 13, and an encrypted document data transmission unit 14. In the document data generation unit 11, document data is generated by using a document generation application and the like, and image data is obtained from a scan unit (not shown), a digital camera or the like. Note that "document data" mentioned here includes document data and image data. In the document data encryption processing unit 12, document data is encrypted by using a document data encryption key. The encrypted document data storing unit 13 stores the encrypted document data. The encrypted document data transmission unit 14 transmits the encrypted document data to a designated job execution device corresponding to a request from the owner or the manager of the document data. The encrypted document data may be transmitted to an object job execution device beforehand. Alternatively, an object job execution device may receive a job ticket first and then receive the encrypted document data when processing the document data.

The job ticket unit 30 includes a job ticket issuance request processing unit 15, a job ticket generation unit 16, a job ticket encryption processing unit 17, and a job ticket transmission unit 18. The job ticket issuance request processing unit 15 starts processing upon receiving a job ticket issuance request from the owner or the manager of the document data which is an object of the job. The job ticket generating unit 16 generates a job ticket including an ID of the document data which is an object of the job, a document data decryption key for the encrypted document data, information about the content of the job processing and the like. The job ticket encryption processing unit 17 encrypts the job ticket with a job ticket encryption key which is different from the document data encryption key used for encrypting the document data. If a plurality of job tickets are generated with respect to a piece of document data, the job ticket encryption processing unit 17 encrypts the job tickets with job ticket encryption keys which are different for the respective job tickets generated. The job ticket transmission unit 18 transmits a job ticket to a designated job execution device corresponding to a request from the owner or the manager. In this job ticket issuing device 10, a job ticket and document data are encrypted separately with a document data encryption key and a job ticket encryption key which are different, respectively. Thereby, the security level is improved.

Further, functions of other components of the job ticket issuing device 10 will be explained. The document data decryption key generating unit 21 generates a document data decryption key including information required for decrypting the encrypted document data. The job ticket decryption key generating unit 22 generates a job ticket decryption key including information required for decrypting the encrypted job ticket. The job ticket decryption key transmission unit 23 transmits the job ticket decryption key to a designated job execution device. The job ticket verification information management unit 24 manages information for verifying the document data which is an object of the job with the job ticket issued (two-way authentication). The job ticket verification information transmission unit 25 transmits information, to a designated job execution device, for verifying the document data which is an object of the job with the job ticket issued (two-way authentication).

The job ticket issuing device is capable of issuing a plurality of job tickets with respect to the same document data. In such a case, encryption processing of the document data should be executed once, and there is no need to perform the encryption processing again. Only encryption processing for each job ticket should be done. Therefore, there is no need to perform encryption processing of the document data causing a large load on the encryption processing again, even in the case of generating a plurality of job tickets. Thereby, the load on the encryption processing can be reduced. Further, since only the job tickets should be transmitted, communication load can also be reduced.

Figure 5:
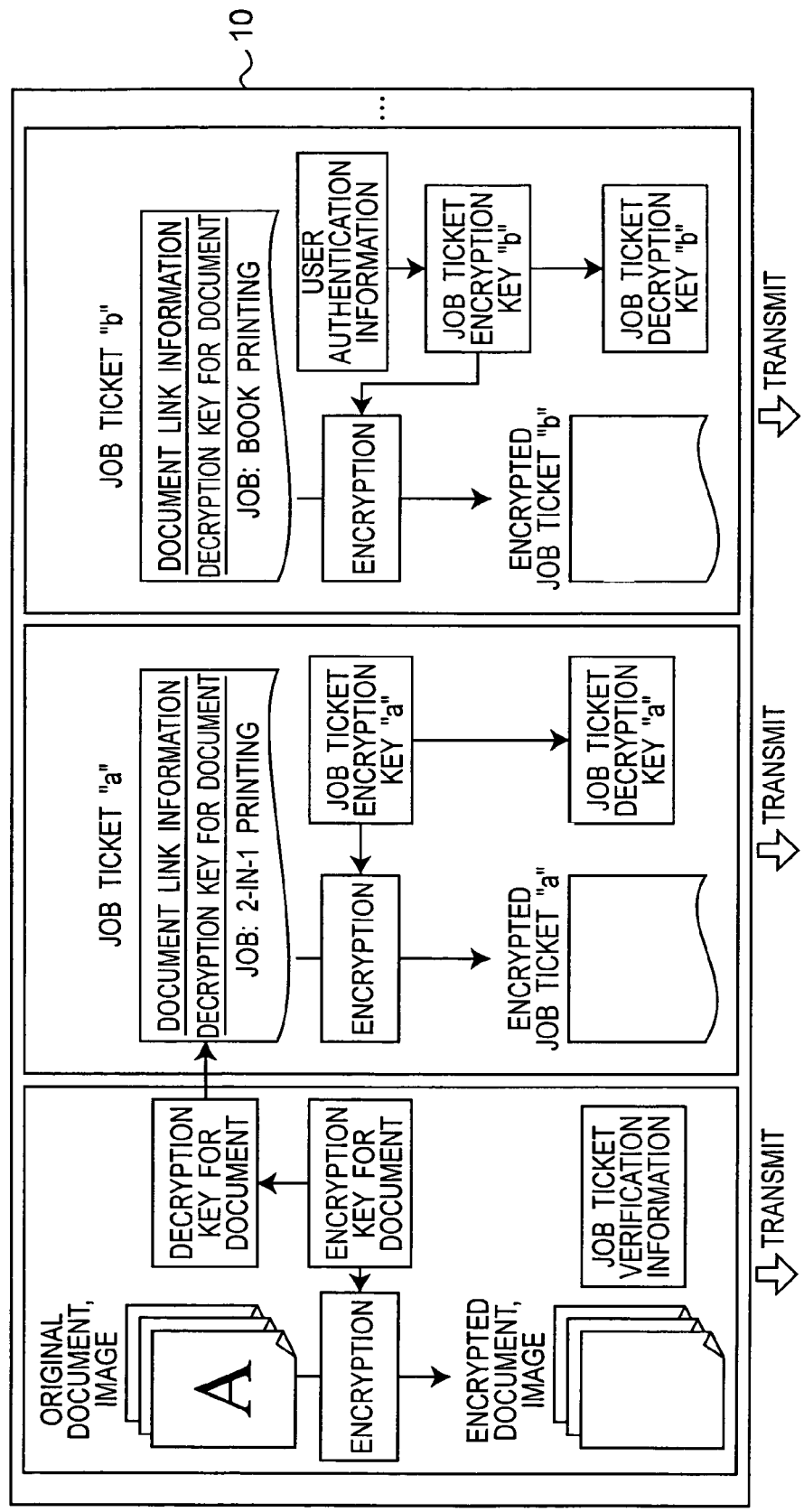
FIG. 5 is a schematic diagram showing transmission processing of two kinds of job tickets in the job ticket issuing device according to the embodiment 1 of the present invention.

FIG. 5 is a schematic diagram showing an example of job ticket transmission processing of two kinds of job processing, that is, 2-in-1 printing and book printing, performed with respect to the same document data. In the job ticket issuing device 10, document data (original document, images) is encrypted with a document data encryption key (encryption key for document) and transmitted. Further, for a job of 2-in-1 printing, a job ticket "a" is generated, which includes information about the content of the job processing (2-in-1 printing), a document data decryption key and document link information for correlating the document data with the job ticket, and the job ticket "a" is encrypted with a job ticket encryption key "a" which is different from the document data encryption key, and transmitted. Similarly, for a job of book printing, a job ticket "b" is generated, and encrypted with a job ticket encryption key "b" which is different from the document data encryption key and the job ticket encryption key "a", and transmitted. If required, a user authentication may be performed by using user authentication information. In FIG. 5, a user authentication is performed by using user authentication information when the job ticket "b" is encrypted. The user authentication may be performed by a general method. For example, it may be performed by verifying an ID with a password inputted.

Next, explanation will be given for the job execution device 50.

Figure 4:
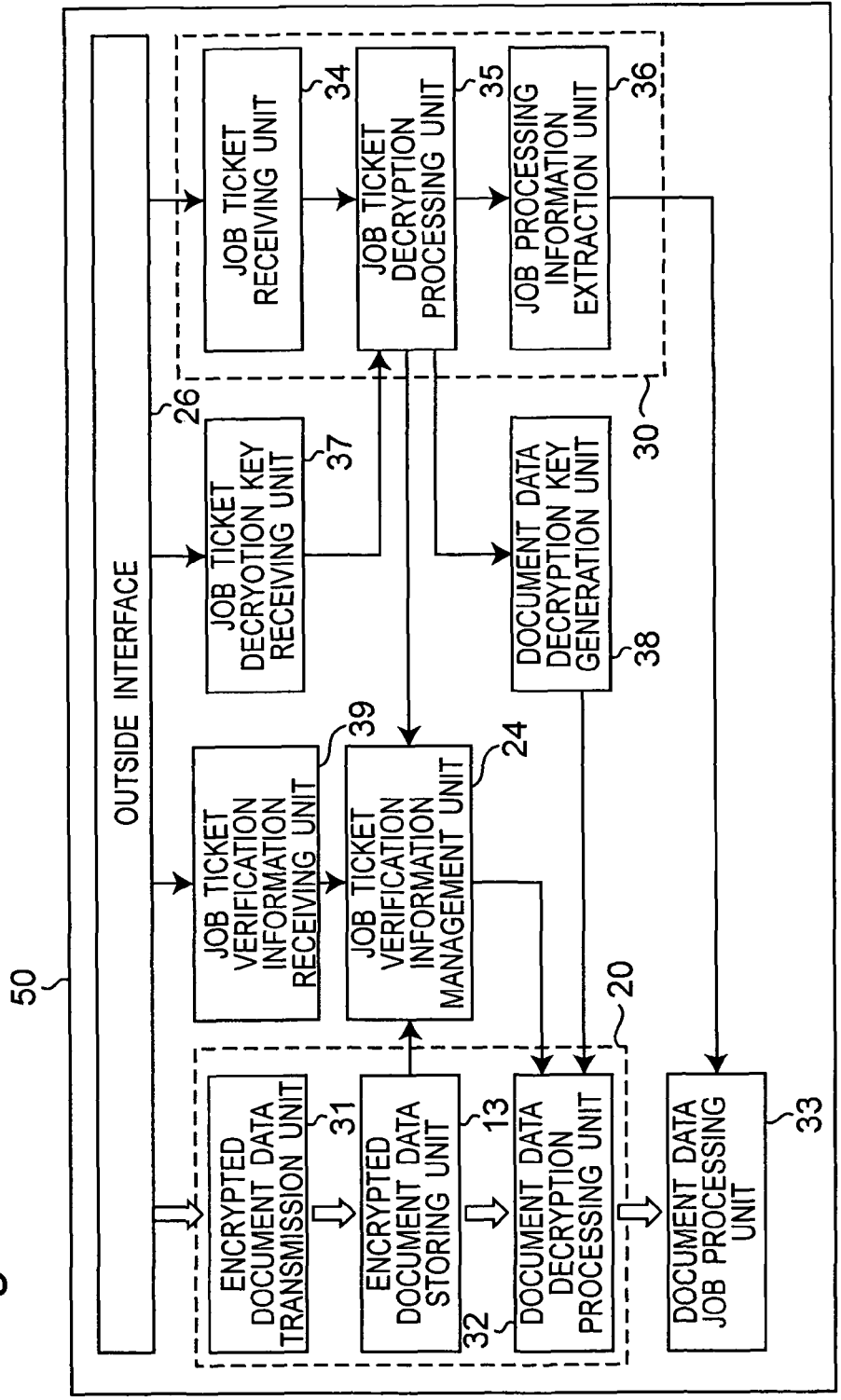
FIG. 4 is a block diagram showing the functional configuration of the job execution device according to the embodiment 1 of the present invention.

FIG. 4 is a block diagram showing the functional configuration of the job execution device 50. The job execution device 50 includes a document data unit 20 and a job ticket unit 30. The job execution device 50 further includes a job ticket decryption key receiving unit 37 for receiving a job ticket decryption key, a document data decryption key extraction unit 38, a job ticket verification information receiving unit 39 for receiving job ticket verification information, and a job ticket verification information management unit 24 for managing the job ticket verification information.

Each component thereof will be explained below.

The document data unit 20 includes an encrypted document data receiving unit 31, an encrypted document data storing unit 13, a document data decryption processing unit 32, and a document data job processing unit 33. The encrypted document data receiving unit 31 receives encrypted document data. The encrypted document data storing unit 13 stores the encrypted document data received. The document data decryption processing unit 32 decrypts the encrypted document data by using a document data decryption key extracted from the job ticket. The document data job processing unit 33 executes job processing to the decrypted document data corresponding to the content of the job processing extracted from the job ticket.

The job ticket part 30 includes a job ticket receiving unit 34, a job ticket decryption processing unit 35, and a job processing information extraction unit 36. The job ticket receiving unit 34 receives an encrypted job ticket. The job ticket decryption processing unit 35 decrypts the encrypted job ticket by using the job ticket decryption key received. The job processing information extraction unit 36 extracts information such as the content of the job processing from the decrypted job ticket.

Figure 6:
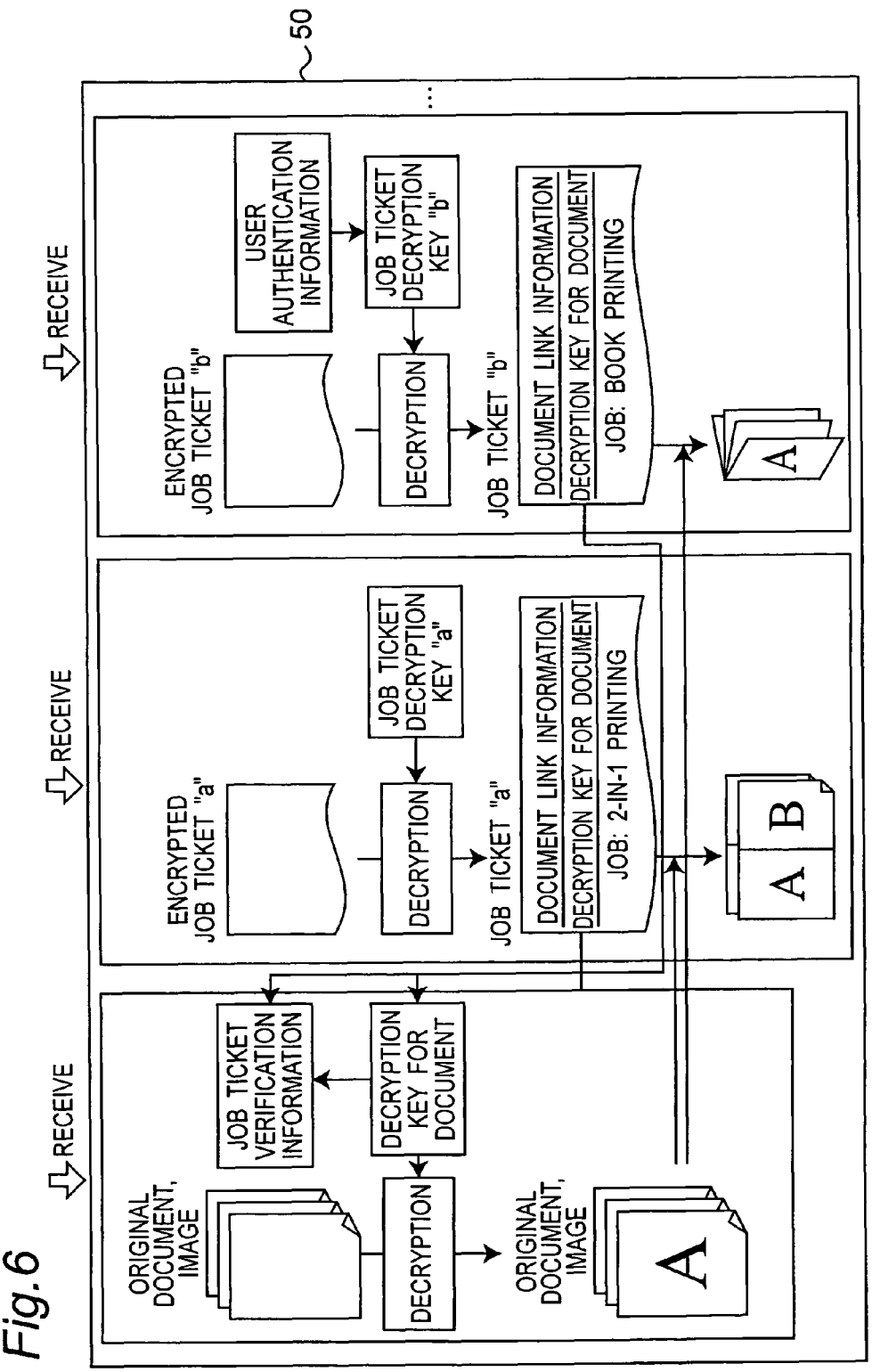
FIG. 6 is a schematic diagram showing reception processing of two kinds of job tickets in the job execution device according to the embodiment 1 of the present invention.

FIG. 6 is a schematic diagram showing exemplary receiving processing of the encrypted document data and the encrypted job tickets of two kinds. The job execution device 50 receives the encrypted document data, the encrypted job ticket "a", and the encrypted job ticket "b". The encrypted job ticket "a" is decrypted by using the job ticket decryption key "a" to thereby obtain the job ticket "a". From the job ticket "a", information about the content of the job processing (2-in-1 printing), a document data decryption key (decryption key for document), and the document link information (job ticket ID, document ID) for correlating the document data with the job ticket are extracted. The encrypted document data is decrypted by using the document data decryption key extracted to thereby obtain the document data (original document, images). For the document data, the job processing of 2-in-1 printing is executed. Similarly, the encrypted job ticket "b" is also decrypted, and the job processing of book printing is executed for the document data. If required, authentication may be performed by using user authentication information. For example, in FIG. 6, authentication is performed by using user authentication information when the encrypted job ticket "b" is decrypted.

Figure 7:
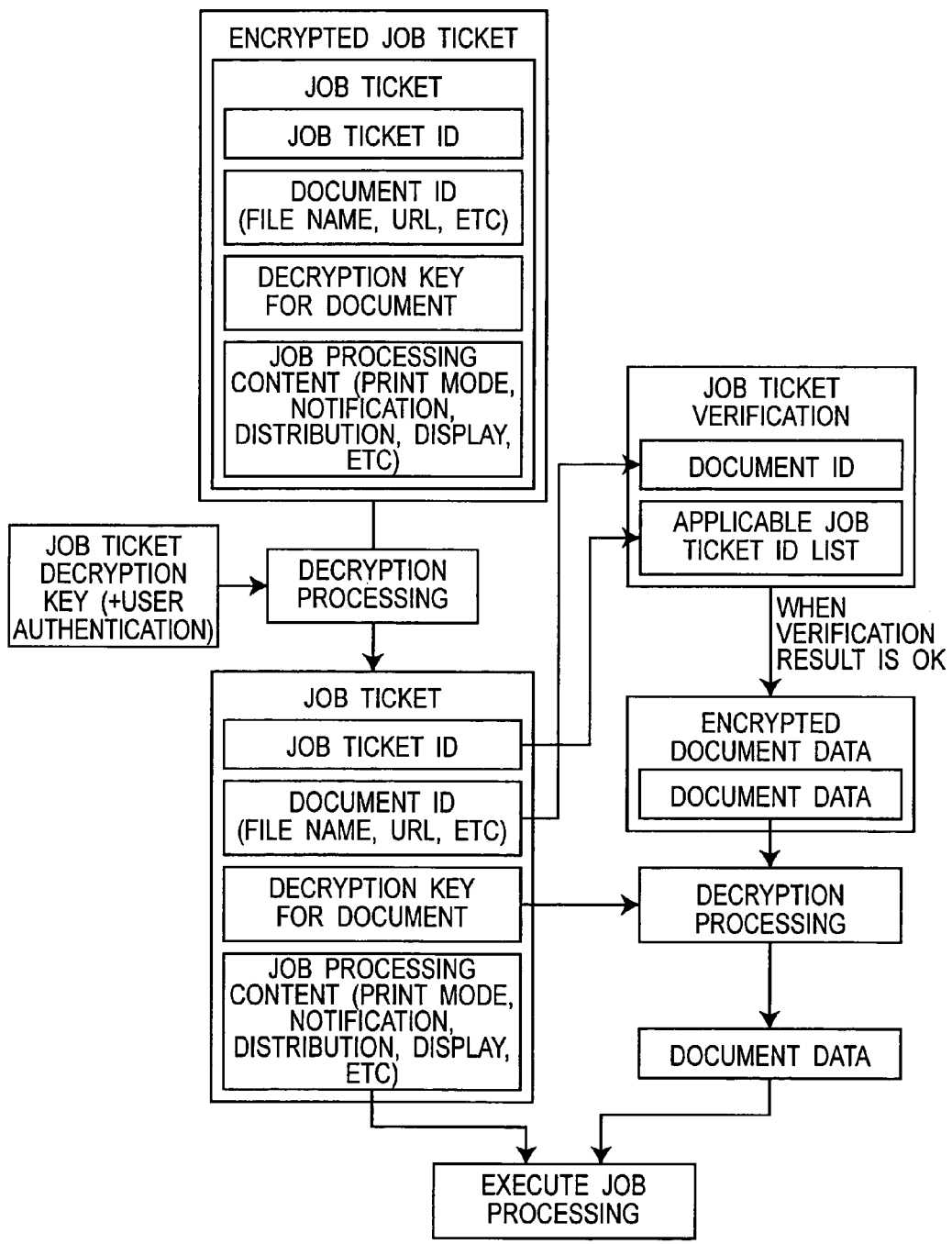
FIG. 7 is a schematic diagram showing reception processing of an encrypted job ticket and encrypted document data.

FIG. 7 is a schematic diagram illustrating the data configuration of a job ticket and two-way authentication using job ticket verification information. The job ticket includes a job ticket ID which is identification information of the job ticket, a document data ID (file name, URL, etc.) which is identification information of the object document data, a document data decryption key used for decrypting the object document data encrypted, and information about the content of the job processing of the document data. The information about the content of the job processing is information about the content of job processing executed to the decrypted document data, for example, including designation of print mode of the document data, notification and distribution of the document data to the user, and designation of processing such as a display on the job execution device. The job ticket verification information includes a job ticket ID and a document data ID related to the job ticket ID, which correlates the job ticket or the like with the object document data. In the job ticket verification information, information about the expiration date and effective number of times of the job ticket may be designated. This enables to limit job processing after the expiration date or exceeding the effective number of times. Further, if a reception of an already distributed job ticket is to be prohibited, which has been authorized initially, it is possible to do so by deleting the corresponding job ticket ID from the job ticket verification information. Note that after the encrypted job ticket is decrypted, information about the content of the job processing is extracted and is used in executing the job processing. In this case, the extracted information about the content of the job processing may not be displayed on the screen, as described later. Further, although the information about the content of the job processing is displayed on the screen, certain conditions may be displayed on the screen in the unchangeable state.

Figure 8:
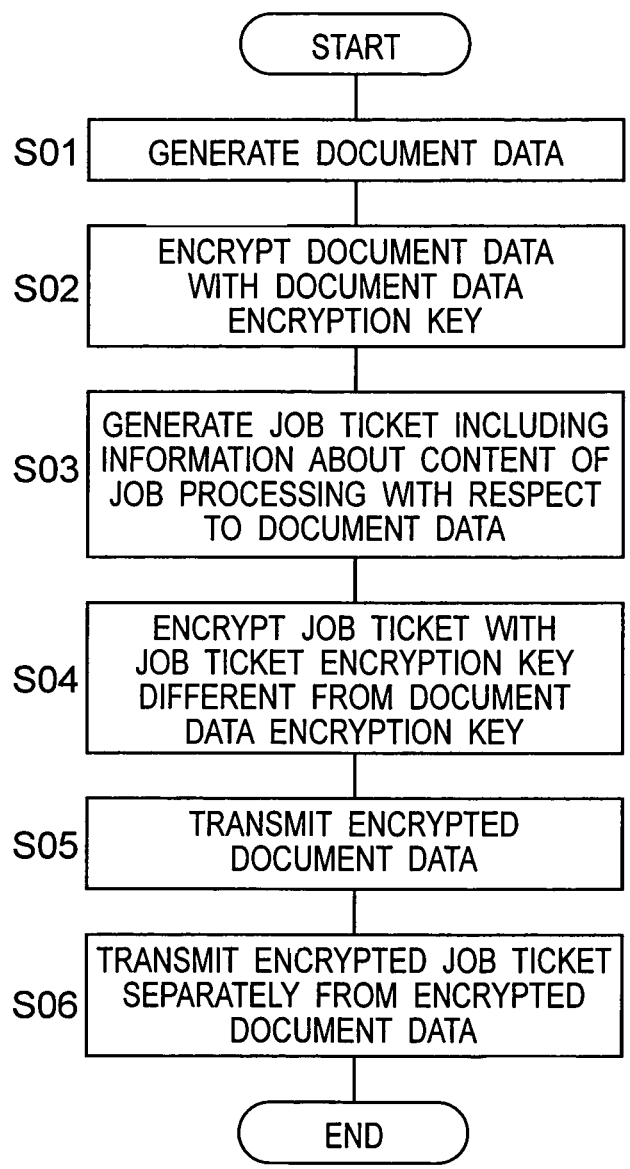
FIG. 8 is a flowchart showing a method of issuing a job ticket according to the embodiment 1 of the present invention.

FIG. 8 is a flowchart showing a job ticket issuing method.

(a) Document data is generated (S01). The document data may be generated by using a document generation application and the like as described above, or obtained from the scanner unit 8, a digital camera or other information processing device (MFP, terminal, etc.).

(b) The document data is encrypted with a document data encryption key (S02). Note that encryption of the document data may be performed by using an encryption method which can be used generally.

(c) A job ticket including information about the content of the job processing with respect to the document data is generated (S03). As shown in FIG. 7, the job ticket may include a job ticket ID which is identification information of the job ticket, a document data ID which is identification information of the object document data, a document data decryption key, and information about the content of the job processing.

(d) Then, the job ticket is encrypted with a job ticket encryption key which is different from the document data encryption key (S04). Here, it is preferable that a plurality of job tickets be encrypted with different job ticket encryption keys, respectively.

(e) The encrypted document data is transmitted (S05).

(f) The encrypted job ticket is transmitted independently of the encrypted document data (S06). In this job ticket issuing method, encryption processing is performed separately for the encrypted document data and the encrypted job ticket with a document data encryption key and a job ticket encryption key which are different, respectively. Therefore, it is possible to improve the security level. Further, since they are transmitted separately, it is possible to reduce the load on the encryption processing even in a case where job tickets are issued with respect to different, plural job processing.

Figure 9:
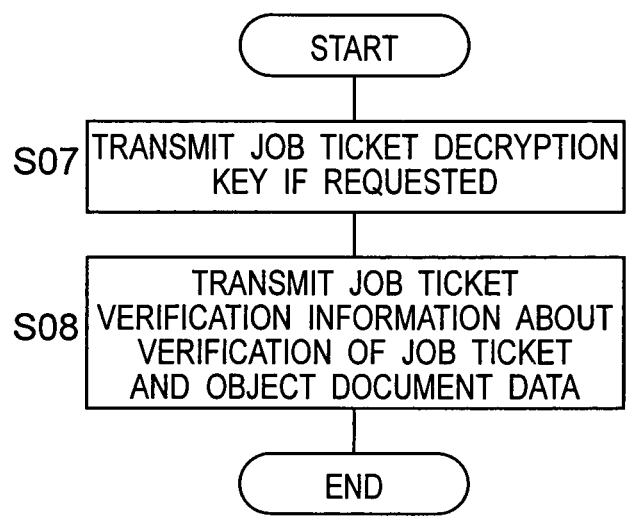
FIG. 9 is a flowchart showing a method of issuing a job ticket decryption key and job ticket verification information.

FIG. 9 is a flowchart relating to a transmission of a job ticket decryption key and job ticket verification information.

(a) A job ticket decryption key is transmitted upon request (S07). Note that the job thicket decryption key may be transmitted following the job ticket issuing method of FIG. 8. However, it is preferable from the security viewpoint to transmit after receiving a request.

(b) Next, job ticket verification information about verification (two-way authentication) of the job ticket and the document data related thereto is transmitted (S08). In the job ticket receiving processing, it is possible to eliminate an unauthorized job ticket by verifying the correlation of the job ticket and the document data by using the job ticket verification information, and further, it is possible to improve the security level. When an unauthorized job ticket is detected, histories such as information about a sender and a requesting party may be saved and notified to the writer (manager) of the document.

Figure 10:
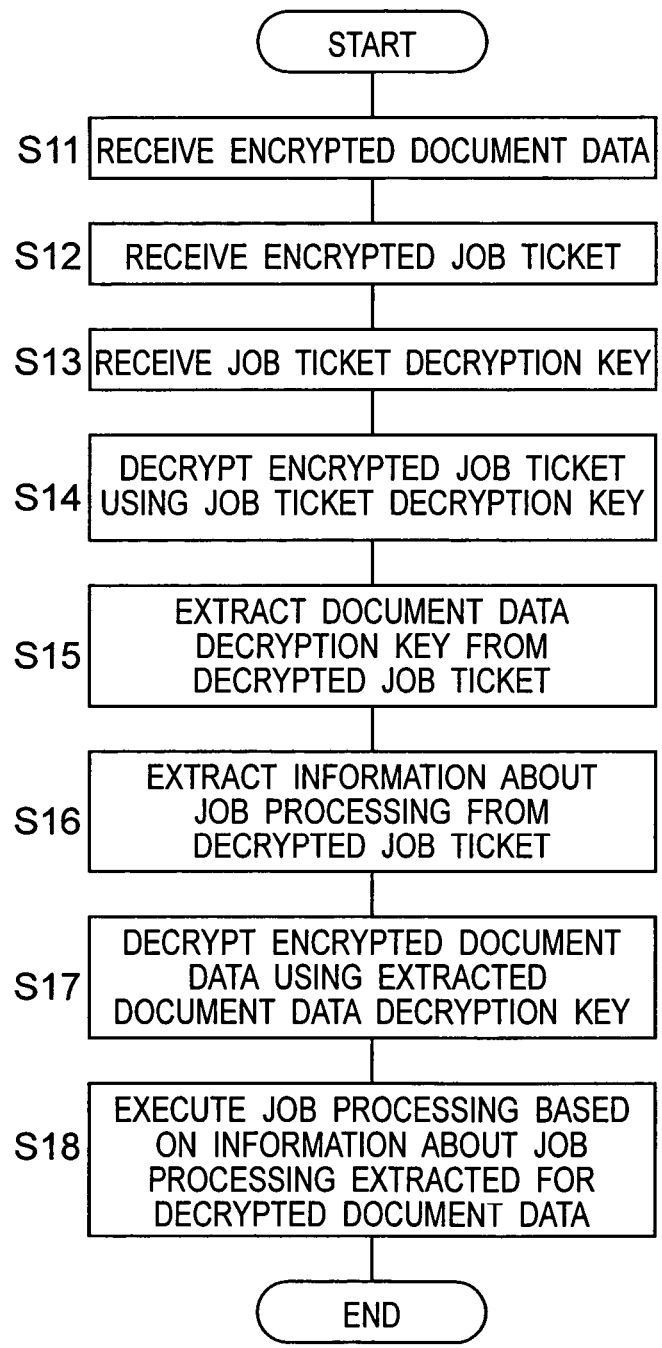
FIG. 10 is a flowchart showing a job executing method according to the embodiment 1 of the present invention.

FIG. 10 is a flowchart showing the job executing method.

(a) The encrypted document data is received (S11).

(b) The encrypted job ticket is received (S12). This job executing method is characterized in that the encrypted job ticket is received independently of the encrypted document data. In General, document data has a large capacity and heavy transmission load. However, the job ticket is encrypted with a job ticket encryption key which is different from the document data encryption key and transmitted independently of the document data. Therefore, the communication load can be reduced even in the case of generating a plurality of job tickets.

(c) A job ticket decryption key for decrypting the encrypted job ticket is received (S13).

(d) The encrypted job ticket is decrypted by using the job ticket decryption key received (S14).

(e) A document data decryption key is extracted from the decrypted job ticket (S15).

(f) Further, information about job processing is extracted from the decrypted job ticket (S16).

(g) The encrypted document data is decrypted by using the document data decryption key extracted (S17).

(h) The job processing is executed based on the information about the job processing extracted with respect to the decrypted document data (S18).

Figure 11:
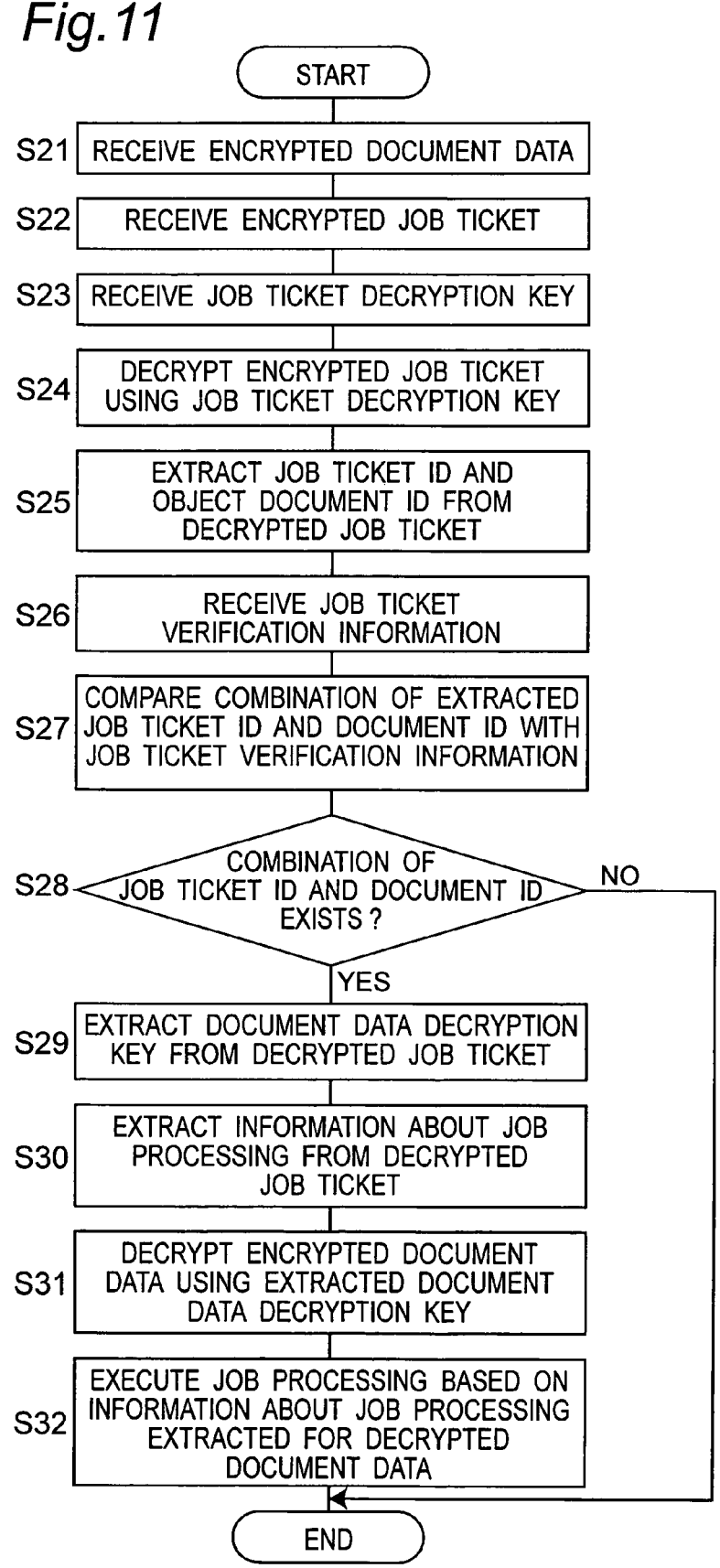
FIG. 11 is another exemplary flowchart showing a job execution method according to the embodiment 1 of the present invention.

FIG. 11 is a flowchart showing another example of the job executing method.

(a) The encrypted document data is received (S21).

(b) The encrypted job ticket is received (S22).

(c) A job ticket decryption key is received (S23).

(d) The encrypted job ticket is decrypted by using the job ticket decryption key received (S24).

(e) A job ticket ID and a document ID of the object document are extracted from the decrypted job ticket (S25).

(f) Job ticket verification information is received (S26).

(g) A combination of the job ticket ID and the document ID extracted is compared with the job ticket verification information (S27).

(h) Whether the combination of the job ticket ID and the document ID exists or not is determined (S28). If the combination exists, the two-way authentication is performed successfully, and the processing moves to the next step. On the other hand, if the combination does not exist, it is determined as an unauthorized job ticket and the processing ends. By performing two-way authentication in this manner, an unauthorized job ticket can be eliminated.

(i) A document data decryption key is extracted from the decrypted job ticket (S29).

(j) Information about the content of the job processing is extracted from the decrypted job ticket (S30). For example, in FIG. 6, "2-in-1 printing" is extracted as a job processing content from the job ticket "a", and "book printing" is extracted from the job ticket "b".

(k) The encrypted document data is decrypted by using the document data decryption key extracted (S31).

(l) Job processing is executed based on the information about the job processing extracted for the decrypted document data (S32).

With the processing described above, the encrypted document data and the encrypted job ticket received are decrypted, and job processing can be executed based on the content of the job processing extracted from the decrypted job ticket with respect to the decrypted document data.

In this job executing method, the job ticket ID and the document ID are extracted from the job ticket, which is compared with the job ticket verification information in which the job ticket and the document data are correlated so as to verify whether the combination exists. Thereby, an unauthorized job ticket can be eliminated. Therefore, the security level can be improved.

In a job ticket, at least a part of the job processing content may be stored in a state where it is unchangeable on the user side. In such a case, the job ticket may be encrypted as a whole whereby the user cannot directly change the job processing content as a whole as described above, for example. To make the job processing content to be unchangeable, after the encrypted job ticket is decrypted, information about the content of the job processing extracted should not be displayed but be used as it is only in the document data job processing unit 33. Alternatively, a job processing content change prohibiting unit, for prohibiting at least a part of the job processing content extracted to be changed, may be further provided. Moreover, in addition to the encryption of the job ticket as a whole, information about a part of the content of the job processing, which is unchangeable, may be encrypted partially. In detail, a job ticket may information restriction information such as changeable items and the selection range, unchangeable items, items which can be displayed/cannot be displayed on the screen and the conditions (e.g., displayed only to a specific user passing user authentication and to the manager of the device), and in the job execution device 50, the unchangeable items are set not to be changed on the job execution device 50 side and the changeable items are displayed so as to be changeable, based on the information.

Figure 12:
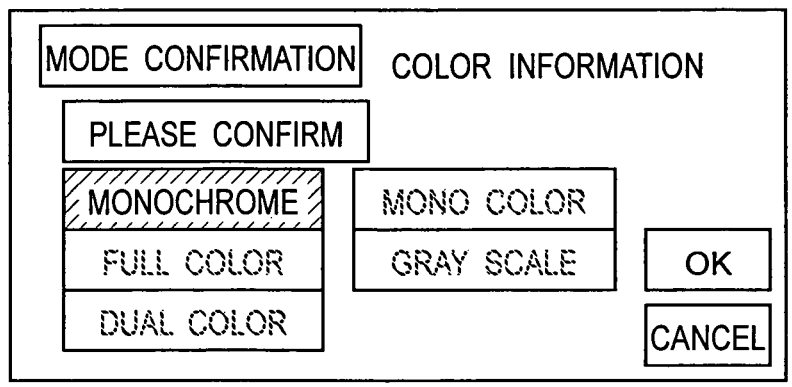
FIG. 12 shows an exemplary screen display in which a part of job processing contents is displayed as unchangeable.
Figure 13:
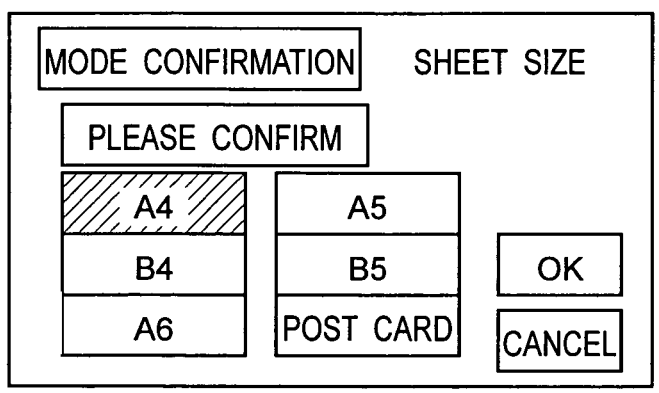
FIG. 13 shows an exemplary screen display in which a part of job processing contents is displayed as changeable.

Further, at least a part of the content of the job processing extracted from the decrypted job ticket may be set to be able to be displayed on the screen. FIG. 12 is an example of a screen display showing a state where the setting mode of the color information is unchangeable, among pieces of information about the content of the job processing extracted. In FIG. 12, items unchangeable on the user side are shown by the dotted lines. However, they may be displayed at gray scale in the actual display screen. In such a case, only the content of the job processing can be verified, so the mode of the color information cannot be changed from "monochrome" to "full color", "dual color" or the like. Further, the content of the job processing may be set to be changeable or unchangeable for each job ticket. FIG. 13 shows an example of a screen display showing a state where all items for the sheet size are changeable, among pieces of information of the content of the job processing extracted. In FIG. 13, the sheet size is displayed as "A4", as the set content of the job processing, for example, but other items are also displayed to be selectable. That is, the sheet size can be changed from "A4" to another size such as "B4", "A6", "A5", "B5", or "Post Card". Further, the application setting mode at the time of printing may be set to be changeable from "2-in-1" to "4-in-1".

Further, based on the present embodiment, when document data is updated, it is possible to execute jobs of the updated document data with an outside job ticket without changing the job ticket which has been distributed, by encrypting the updated document data with the same document data encryption key as that used for encrypting the document data before updating. Therefore, there is no need to regenerate and distribute job tickets.

Although the encrypted job ticket is transmitted from the job ticket issuing device to the job execute device directly on the above embodiments, the present invention is not limited to this. For example, when a job issuing user distributes any document data to other user, the issuing user may transmit the encrypted job ticket to the other user's terminal. When the other user order to print, the other user can transmit the encrypted job ticket to the job execute device. In addition, although encrypted document data is transmitted from the job ticket issuing device to the job execute device previously on the above embodiments, the present invention is not limited to this. For example, because the job ticket includes the document link information for correlating the document data with the job ticket, therefore, storing the document data in the job execute device is not indispensable before job executing, so that the encrypted document data may be transmitted to the job execute device directly or indirectly at the moment of job executing.

The job ticket issuing device according to the present invention is applicable to a device for transmitting job tickets relating to the content of job processing with respect to document data.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A job ticket issuing device comprising:
   a document encryption processing device for encrypting document data with a document data encryption key;
   a job ticket generation unit for generating a job ticket including information about a content of job processing with respect to the document data;
   a job ticket encryption processing unit for encrypting the job ticket with a job ticket encryption key which is different from the document data encryption key; and
   wherein the job ticket is generated as a data which is separate from a prior document data that has been produced previously, and includes information relating to the job processing with respect to the prior document data, and as an another data to the prior document data.

2. The job ticket issuing device according to claim 1, wherein the job ticket includes a restriction information which is at least one of a changeable content of job processing and a unchangeable content of job processing.

3. The job ticket issuing device according to claim 1, further comprising an encrypted job ticket transmission unit for transmitting the encrypted job ticket.

4. The job ticket issuing device according to claim 1, further comprising an encrypted document data transmission unit for transmitting the encrypted document data.

5. The job ticket issuing device according to claim 1, wherein the job ticket generation unit generates a job ticket further including a document data decryption key used for decrypting the encrypted document data in addition to the information about the content of the job processing.

6. The job ticket issuing device according to claim 1, wherein the job ticket generation unit generates a job ticket further including identification information of the job ticket and identification information of the document data in addition to the information about the content of the job processing.

7. The job ticket issuing device according to claim 1, wherein the job ticket generation unit is capable of generating a plurality of job tickets with respect to a piece of document data.

8. The job ticket issuing device according to claim 2, further comprising a job ticket decryption key transmission unit for transmitting a job ticket decryption key used for decrypting the encrypted job ticket.

9. The job ticket issuing device according to claim 1, further comprising a job ticket verification information management unit for managing job ticket verification information for correlating the job ticket and the document data.

10. A computer-implemented job ticket issuing method comprising:
    encrypting, by a computer, document data with a document data encryption key;
    generating, with the computer, a job ticket including information about a content of job processing with respect to the document data;
    encrypting the job ticket with a job ticket encryption key which is different from the document data encryption key; and
    wherein the job ticket is generated as a data which is separate from a prior document data that has been produced previously, and includes information relating to the job processing with respect to the prior document data, and as an another data to the prior document data.

11. The job ticket issuing method according to claim 10, wherein the job ticket includes a restriction information which is at least one of a changeable content of job processing and a unchangeable content of job processing.

12. The job ticket issuing method according to claim 10, further comprising transmitting the encrypted job ticket.

13. The job ticket issuing method according to claim 10, further comprising transmitting the encrypted document data.

14. The job ticket issuing method according to claim 10, wherein in the step of generating the job ticket, a job ticket further including a document data decryption key used for decrypting the encrypted document data, in addition to the information about the content of the job processing, is generated.

15. The job ticket issuing method according to claim 10, wherein in the step of generating the job ticket, a job ticket further including identification information of the job ticket and identification information of the document data, in addition to the information about the content of the job processing, is generated.

16. The job ticket issuing method according to claim 10, wherein in the step of generating the job ticket, generating a plurality of job tickets with respect to a piece of document data.

17. A computer-implemented job ticket issuing method comprising:
- encrypting, by a computer, document data with a document data encryption key;
- generating, with the computer, a job ticket including information about a content of job processing with respect to the document data;
- encrypting the job ticket with a job ticket encryption key which is different from the document data encryption key;
- generating the job ticket including information about the content of the job processing with respect to the document data;
- wherein in the step of generating the job ticket, generating a plurality of job tickets with respect to a piece of document data; and
- wherein in the step of encrypting the job ticket, the plurality of job tickets are encrypted with different job ticket encryption keys, respectively.

18. The job ticket issuing method according to claim 12, further comprising transmitting a job ticket decryption key used for decrypting the encrypted job ticket.

19. The job ticket issuing method according to claim 12, further comprising generating job ticket verification information for correlating the job ticket with the document data.

20. A nontransitory computer-readable recording medium which stores a job ticket issuance program for prompting a computer to execute a job ticket issuing method comprising:
- encrypting document data with a document data encryption key;
- generating a job ticket including information about a content of job processing with respect to the document data;
- encrypting the job ticket with a job ticket encryption key which is different from the document data encryption key; and
- wherein the job ticket is generated as a data which is separate from a prior document data that has been produced previously, and includes information relating to the job processing with respect to the prior document data, and as an another data to the prior document data.

21. A job execution device comprising:
- a memory device for storing encrypted document data;
- a job ticket receiving unit for receiving an encrypted job ticket which includes information about a content of job processing with respect to the document data, wherein the job ticket receiving unit receives the encrypted job ticket from an external device;
- a job ticket decryption processing unit for decrypting the encrypted job ticket by using a job ticket decryption key;
- a job processing information extraction unit for extracting the information about the content of the job processing from a decrypted job ticket;
- a document data decryption processing unit for decrypting the encrypted document data by using a document data decryption key which is different from the job ticket decryption key;
- a document data job processing unit for executing a job, based on the content of the job processing extracted, with respect to the decrypted document data; and
- wherein the job ticket is generated as a data which is separate from a prior document data that has been produced previously, and includes information relating to the job processing with respect to the prior document data, and as an another data to the prior document data.

22. The job execution device according to claim 21, wherein the job ticket includes a restriction information which is at least one of a changeable content of job processing and a unchangeable content of job processing, and the job execution device further comprising a job processing content change prohibiting unit for prohibiting a part of the processing content based on the restriction information.

23. The job execution device according to claim 22, further comprising a display unit for displaying the changeable content based on the restriction information.

24. The job execution device according to claim 21, further comprising an encrypted document data receiving unit for receiving the encrypted document data.

25. The job execution device according to claim 21, wherein the job ticket further includes the document data decryption key, and the job execution device further comprises a document data decryption key extraction unit for extracting the document data decryption key from the decrypted job ticket.

26. The job execution device according to claim 21, wherein the job ticket further includes identification information of the job ticket and identification information of the document data; and the job execution device further comprises a job ticket verification information management unit for extracting the identification information of the job ticket and the identification information of the document data from the decrypted job ticket, and verifying it with job ticket verification information for correlating the job ticket and the document data.

27. A computer-implemented job executing method comprising:
- storing, by a computer, encrypted document data;
- receiving an encrypted job ticket, including information about a content of job processing with respect to the document data, independently of the document data, wherein the encrypted job ticket is received from a device external to the computer;
- decrypting the encrypted job ticket by using a job ticket decryption key;
- extracting the information about the content of the job processing from a decrypted job ticket;
- decrypting the encrypted document data by using a document data decryption key which is different from the job ticket decryption key;
- executing a job based on the content of the job processing extracted, with respect to the decrypted document data; and
- wherein the job ticket is generated as a data which is separate from a prior document data that has been produced previously, and includes information relating to the job processing with respect to the prior document data, and as an another data to the prior document data.

28. The job execution method according to claim 27, wherein the job ticket includes a restriction information which is at least one of a changeable content of job processing and a unchangeable content of job processing, and the job execution method further comprising prohibiting a part of the processing content based on the restriction information.

29. The job execution method according to claim 28, further comprising displaying the changeable content based on the restriction information.

30. The job executing method according to claim 27, further comprising receiving the encrypted document data.

31. The job executing method according to claim 27, wherein the job ticket further includes the document data decryption key; and the job executing method further comprises the step of extracting the document data decryption key from the decrypted job ticket.

32. The job executing method according to claim 27, wherein the job ticket further includes identification information of the job ticket and identification information of the document data; and the job executing method further comprises the step of extracting the identification information of the job ticket and the identification information of the document data from the decrypted job ticket, and verifying it with job ticket verification information for correlating the job ticket with the document data.

33. A nontransitory computer-readable recording medium which stores a job execution program for prompting a computer to execute a job executing method comprising:
  storing encrypted document data;
  receiving an encrypted job ticket, including information about a content of job processing with respect to the document data, independently of the document data, wherein the encrypted job ticket is received from a device external to the computer;
  decrypting the encrypted job ticket by using a job ticket decryption key;
  extracting the information about the content of the job processing from a decrypted job ticket;
  decrypting the encrypted document data by using a document data decryption key which is different from the job ticket decryption key;
  executing a job based on the content of the job processing extracted, with respect to the decrypted document data; and
  wherein the job ticket is generated as a data which is separate from a prior document data that has been produced previously, and includes information relating to the job processing with respect to the prior document data, and as an another data to the prior document data.

* * * * *